US011226666B2

(12) United States Patent
Hsu et al.

(10) Patent No.: US 11,226,666 B2
(45) Date of Patent: Jan. 18, 2022

(54) POWER FAILURE PREVENTION SYSTEM WITH POWER MANAGEMENT MECHANISM AND POWER FAILURE PREVENTION METHOD WITH POWER MANAGEMENT MECHANISM

(71) Applicant: ANPEC ELECTRONICS CORPORATION, Hsinchu (TW)

(72) Inventors: Chun-Kai Hsu, Hsinchu (TW); Chih-Heng Su, Hsinchu (TW); Chih-Yuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/853,878

(22) Filed: Apr. 21, 2020

(65) Prior Publication Data
US 2021/0240244 A1 Aug. 5, 2021

(30) Foreign Application Priority Data

Feb. 3, 2020 (TW) .................................. 109103225

(51) Int. Cl.
G06F 1/30 (2006.01)
H02M 3/158 (2006.01)
G06F 1/3203 (2019.01)
(52) U.S. Cl.
CPC .............. *G06F 1/30* (2013.01); *G06F 1/3203* (2013.01); *H02M 3/1582* (2013.01)

(58) Field of Classification Search
CPC ....... G06F 1/30; G06F 1/3203; H02M 3/1582
See application file for complete search history.

(56) References Cited

U.S. PATENT DOCUMENTS

| 8,766,602 | B1* | 7/2014 | Kimes | H02H 9/026 320/137 |
|---|---|---|---|---|
| 10,637,347 | B1* | 4/2020 | Hsu | H02M 1/32 |
| 2009/0033304 | A1 | 2/2009 | Benedict | |
| 2011/0309809 | A1* | 12/2011 | Rao | H02H 9/001 323/282 |
| 2012/0025768 | A1* | 2/2012 | Nakano | B60L 50/40 320/116 |
| 2013/0119782 | A1* | 5/2013 | Ichikawa | G01R 31/327 307/113 |

(Continued)

*Primary Examiner* — Chun Cao
(74) *Attorney, Agent, or Firm* — Li & Cai Intellectual Property (USA) Office

(57) ABSTRACT

A power failure prevention system and method with a power management mechanism are provided. A switch circuit is connected to a first terminal of an inductor. An energy storage circuit is connected to the switch circuit. A pre-charged circuit is connected to an input power source and a second terminal of the inductor. A pre-charging control circuit is connected to the pre-charged circuit and configured to obtain a voltage of a node between the pre-charged circuit and the second terminal of the inductor, a voltage of the switch circuit or a voltage of the energy storage circuit as a pre-charged voltage. The input power source pre-charges the pre-charged circuit. When the pre-charging control circuit determines that the pre-charged voltage is higher than or equal to a reference voltage, the pre-charging control circuit controls the pre-charged circuit, allowing the input power source to charge the energy storage circuit.

14 Claims, 5 Drawing Sheets

(56) References Cited

U.S. PATENT DOCUMENTS

| | | | |
|---|---|---|---|
| 2015/0035539 A1* | 2/2015 | Wakida | B60L 3/003 |
| | | | 324/418 |
| 2015/0084404 A1* | 3/2015 | Hashim | B60L 50/50 |
| | | | 307/9.1 |
| 2017/0133837 A1* | 5/2017 | Hasan | B60L 50/30 |
| 2017/0207634 A1* | 7/2017 | Katano | H02P 27/06 |
| 2021/0050776 A1* | 2/2021 | Ma | H02J 7/345 |

* cited by examiner

POWER FAILURE PREVENTION SYSTEM WITH POWER MANAGEMENT MECHANISM AND POWER FAILURE PREVENTION METHOD WITH POWER MANAGEMENT MECHANISM

CROSS-REFERENCE TO RELATED PATENT APPLICATION

This application claims the benefit of priority to Taiwan Patent Application No. 109103225, filed on Feb. 3, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power failure prevention system, and more particularly to a power failure prevention system with a power management mechanism and a method thereof.

BACKGROUND OF THE DISCLOSURE

With the development of power application technologies, more and more electronic devices that require electric power for operation have been developed, so that more and more electric power is in demand. However, whenever the power is abnormally powered down, people's lives are subjected to shock and inconvenience. When a power supply in a factory production line or other applications is interrupted, significant financial losses may be suffered by a manufacturer or a user. Therefore, the power failure prevention system is widely used. However, an inrush current often exists in a power supply circuit. The inrush current is an excessive transient current and usually generated at a moment when the power supply circuit is turned on, which may cause the power supply circuit to generate noise and damage load and circuit components of the power failure prevention system.

SUMMARY OF THE DISCLOSURE

In response to the above-referenced technical inadequacies, the present disclosure provides a power failure prevention system with a power management mechanism. The power failure prevention system includes a switch circuit, an energy storage circuit, a pre-charged circuit and a pre-charging control circuit. The switch circuit is connected to a first terminal of an inductor. The energy storage circuit is connected to the switch circuit. The pre-charged circuit is connected to an input power source and a second terminal of the inductor. The input power source pre-charges the pre-charged circuit in a pre-charging mode. The input power source stops pre-charging the pre-charged circuit in an energy storage mode and charges the energy storage circuit through the inductor and the switch circuit. The pre-charging control circuit is connected to the pre-charged circuit. The pre-charging control circuit is configured to obtain a voltage of a node between the pre-charged circuit and the second terminal of the inductor, a voltage of the switch circuit or a voltage of the energy storage circuit as a pre-charged voltage. The pre-charging control circuit is configured to obtain a reference voltage lower than an input voltage provided by the input power source and compare the pre-charged voltage with the reference voltage to control the pre-charged circuit. When the pre-charging control circuit determines that the pre-charged voltage is lower than the reference voltage, the pre-charging control circuit controls the pre-charged circuit to operate in the pre-charging mode. When the pre-charging control circuit determines that the pre-charged voltage is higher than or equal to the reference voltage, the pre-charging control circuit switches the pre-charged circuit to the energy storage mode from the pre-charging mode.

In certain embodiments, a threshold voltage is subtracted from the input voltage to obtain the reference voltage.

In certain embodiments, the pre-charging control circuit includes a comparator.

In certain embodiments, the switch circuit includes an upper bridge switch and a lower bridge switch. A node between the upper bridge switch and the lower bridge switch is connected to the first terminal of the inductor. A voltage of the node between the upper bridge switch and the lower bridge switch is used as the pre-charged voltage.

In certain embodiments, the energy storage circuit includes a plurality of capacitors connected in parallel with each other.

In certain embodiments, the energy storage circuit includes a plurality of capacitors connected in series with each other.

In certain embodiments, the energy storage circuit includes a plurality of capacitor modules connected in parallel with each other. Each of the capacitor modules includes a plurality of capacitors connected in series with each other.

In certain embodiments, the input power source supplies the input voltage to a power converter. The power converter steps up, down or up to down the input voltage to provide an output voltage.

In certain embodiments, when the input power source cannot supply the input voltage to a power converter, the energy storage circuit discharges to the input power source to regulate the input voltage, and the power converter steps up, down or up to down the input voltage to provide an output voltage.

In addition, the present disclosure provides a power failure prevention method with a power management mechanism, which is applicable to a power failure prevention system. The power failure prevention system includes a switch circuit, an energy storage circuit, a pre-charged circuit and a pre-charging control circuit. The switch circuit is connected to a first terminal of an inductor, the pre-charged circuit is connected to an input power source and a second terminal of the inductor and the pre-charging control circuit. The power failure prevention method includes the following steps: (a) pre-charging the pre-charged circuit by the input power source; (b) obtaining a voltage of a node between the pre-charged circuit and the second terminal of the inductor, a voltage of the switch circuit or a voltage of the energy storage circuit as a pre-charged voltage by the pre-charging control circuit; (c) determining, by the pre-charging control circuit, whether or not the pre-charged voltage is higher than or equal to a reference voltage, wherein the reference voltage is lower than an input voltage provided by the input power source, in response to determining that the pre-charged voltage is not higher than or equal to the reference voltage, returning to step (a), in response to determining that the pre-charged voltage is higher than or equal to the reference voltage, performing next step (d); and (d) stopping pre-charging the pre-charged circuit and charging the energy storage circuit through the inductor and the switch circuit by the input power source.

In certain embodiments, power failure prevention method includes the following step: subtracting a threshold voltage from the input voltage to obtain the reference voltage by the pre-charging control circuit.

In certain embodiments, power failure prevention method includes the following step: obtaining a voltage of the node between an upper bridge switch and a lower bridge switch as the pre-charged voltage by the pre-charging control circuit. The node between the upper bridge switch and the lower bridge switch is connected to the first terminal of the inductor.

In certain embodiments, power failure prevention method includes the following step: determining whether or not the input power source supplies the input voltage to a power converter, in response to determining that the input power source supplies the input voltage to the power converter, stepping up, down or up to down the input voltage to provide an output voltage by the power converter, in response to determining that the input power source does not supply the input voltage to the power converter, discharging the input power source to the input power source to regulate the input voltage by the energy storage circuit, and stepping up, down or up to down the input voltage to provide an output voltage by the power converter.

As described above, the present disclosure provides the power failure prevention system with a power management mechanism and the method thereof. When the input power source can normally supply power, the input power source charges the energy storage circuit as a backup power supply device. When the input power source is powered down, the energy storage circuit provides the voltage to the input power source such that the input power source can supply the power to the circuit components. It is worth noting that, in the present disclosure, the charging operation is divided into two stages. In the first stage, the pre-charged circuit is pre-charged. In the second stage, the energy storage circuit is charged. Therefore, when the voltage of the input power source is higher than the voltage of the energy storage circuit, an overshoot current cannot instantly flow through the energy storage circuit, thereby effectively preventing the circuit components such as the capacitor of the energy storage circuit from being damaged.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
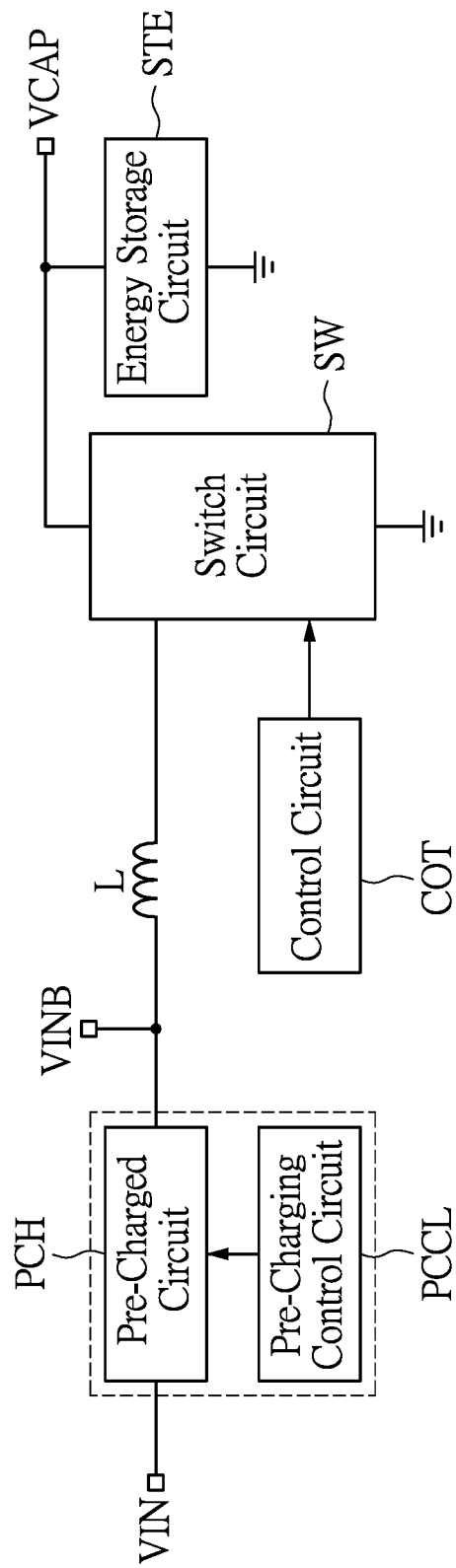
FIG. 1 is a circuit layout diagram of a power failure prevention system with a power management mechanism according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit layout diagram of a power failure prevention system with a power management mechanism according to a first embodiment of the present disclosure.

As shown in FIG. 1, in the embodiment, the power failure prevention system includes a pre-charged circuit PCH, a pre-charging control circuit PCCL, an energy storage circuit STE, a switch circuit SW and a control circuit COT. The energy storage circuit STE is connected to the switch circuit SW. The switch circuit SW is connected to a first terminal of an inductor L. The pre-charged circuit PCH is connected between a second terminal of the inductor L and an input power source for supplying an input voltage VIN. The pre-charging control circuit PCCL is connected to the pre-charged circuit PCH.

First, in the embodiment, the power failure prevention system enters a pre-charging mode. In the pre-charging mode, the input power source such as an input voltage source provides an input voltage VIN to pre-charge the pre-charged circuit PCH. In practice, if necessary, the input power source may be replaced with a power supply device, a current source, or other electrical devices.

In the pre-charging mode, the pre-charging control circuit PCCL obtains a voltage VINB of a node between the pre-charged circuit PCH and the second terminal of the inductor L, a voltage of the switch circuit SW or a voltage VCAP of the energy storage circuit STE as a pre-charged voltage.

The pre-charging control circuit PCCL obtains or sets a reference voltage lower than the input voltage VIN. The pre-charging control circuit PCCL compares the pre-charged voltage with the reference voltage to control the pre-charged circuit PCH.

When the pre-charging control circuit PCCL determines that the pre-charged voltage is lower than the reference voltage, the pre-charging control circuit PCCL controls the pre-charged circuit PCH to operate in the pre-charging mode. In the pre-charging mode, the input power source provides the input voltage VIN to pre-charge the pre-charged circuit PCH.

However, when the pre-charged circuit PCH determines that the pre-charged voltage is higher than or equal to the reference voltage, the pre-charging control circuit PCCL switches the pre-charged circuit PCH to an energy storage mode from the pre-charging mode. In the energy storage mode, the input power source stops pre-charging the pre-charging control circuit PCCL and then the input power source charges the energy storage circuit STE.

When the input power source charges the energy storage circuit STE, the control circuit COT controls the switch circuit SW to allow a current of the inductor L to flow to the energy storage circuit STE through the switch circuit SW to charge the energy storage circuit STE.

After the pre-charging mode ends, the voltage VINB of the node between the pre-charged circuit PCH and the second terminal of the inductor L no longer changes, and is at most approximately the input voltage VIN. When the voltage VCAP of the energy storage circuit STE is very approximately the input voltage VIN, the pre-charged circuit PCH enters the energy storage mode. Therefore, in the energy storage mode, when the input power source supplies the input voltage VIN to the energy storage circuit STE, a current momentarily flowing to the energy storage circuit STE is smaller, thereby preventing the energy storage circuit STE from being charged to have a high inrush voltage.

As described above, the pre-charged circuit PCH and the pre-charging control circuit PCCL are used in the power failure prevention system of the embodiment, thereby effectively preventing the energy storage circuit STE and other circuit components from being damaged by a high inrush current or called an overshoot current. Therefore, lifetimes of the circuit components can be extended.

Figure 2:
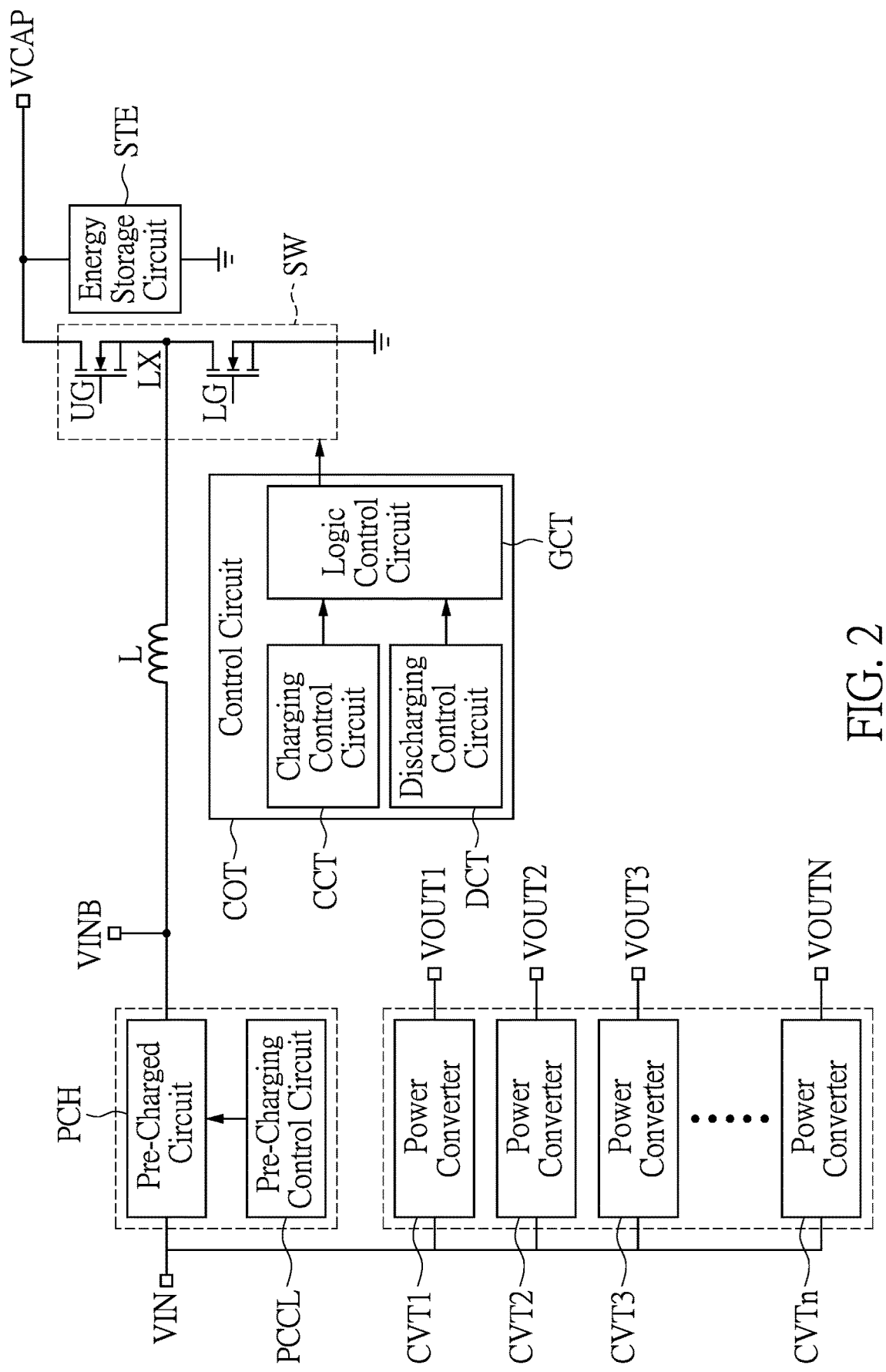
FIG. 2 is a circuit layout diagram of a power failure prevention system with a power management mechanism according to a second embodiment of the present disclosure.

Reference is made to FIG. 2, which is a circuit layout diagram of a power failure prevention system with a power management mechanism according to a second embodiment of the present disclosure. As shown in FIG. 2, in the embodiment, the power failure prevention system includes the pre-charged circuit PCH, the pre-charging control circuit PCCL, the energy storage circuit STE, the switch circuit SW and the control circuit COT.

The switch circuit SW includes an upper bridge switch UG and a lower bridge switch LG. A first terminal of the upper bridge switch UG is connected to the energy storage circuit STE. A second terminal of the upper bridge switch UG is connected to a first terminal of the lower bridge switch LG. A second terminal of the lower bridge switch LG is grounded. A node between the upper bridge switch UG and the lower bridge switch LG is connected to the first terminal of the inductor L. A voltage LX of the node may be used as the pre-charged voltage. Alternatively, the voltage VINB of the node between the pre-charged circuit PCH and the second terminal of the inductor L or the voltage VCAP of the energy storage circuit STE may be used as the pre-charged voltage.

The control circuit COT may include a charge control circuit CCT, a discharge control circuit DCT and a logic control circuit GCT. The charge control circuit CCT and the discharge control circuit DCT are connected to the logic control circuit GCT. The logic control circuit GCT is connected to a control terminal of the upper bridge switch UG and a control terminal of the lower bridge switch LG. The pre-charged circuit PCH is connected to the input power source for providing the input voltage VIN and the pre-charging control circuit PCCL.

Under a normal power supply operation, the input power source supplies the input voltage VIN to charge the energy storage circuit STE to have the voltage VCAP as backup power of the input voltage VIN. When the input power source is powered down and cannot supply the input voltage VIN, the energy storage circuit STE supplies the voltage VCAP. When the input power source charges the energy storage circuit STE, an excessive current momentarily flows to the energy storage circuit STE through the inductor L and the switch circuit SW, which causes damage to the circuit components. In order to prevent this situation, in the embodiment, the normal power supply operation is divided into the pre-charging mode and the energy storage mode.

In the pre-charging mode, the input power source supplies the input voltage VIN to pre-charge the pre-charged circuit PCH. When the input voltage VIN pre-charges the pre-charged circuit PCH such that the voltage VIND, LX or VCAP that is taken as the pre-charged voltage increases to be higher than or equal to the reference voltage, the pre-charging control circuit PCCL switches the pre-charged circuit PCH to the energy storage mode from the pre-charging mode.

In the energy storage mode, the input power source stops pre-charging the pre-charged circuit PCH and charges the energy storage circuit STE. When the input power source charges the energy storage circuit STE, the charge control circuit CCT controls the upper bridge switch UG and the lower bridge switch LG to allow the current of the inductor L to flow to the energy storage circuit STE through the upper bridge switch UG. As a result, the energy storage circuit STE is charged to have the voltage VCAP as the backup power of the input voltage VIN.

When the input power source is powered down and cannot provide the input voltage VIN, the energy storage circuit STE discharges. A discharge current of the energy storage circuit STE may flow to the input power source such that the input power source can supply power to other components such as power converters CVT1 to CVTn.

In the embodiment, the power failure prevention system may be applicable to the power converters CVT1 to CVTn, wherein n represents the number of the power converters CVT1 to CVTn and may be any suitable integer value. For example, each of the power converters CVT1 to CVTn may be a buck converter, a boost converter or a buck-boost converter. The power converters CVT1 to CVTn may convert the input voltage VIN provided by the input power source or the voltage VCAP provided by the energy storage circuit STE respectively into output voltages VOUT1 to VOUTN, wherein N represents the number of the output voltages VOUT1 to VOUTN.

Figure 3:
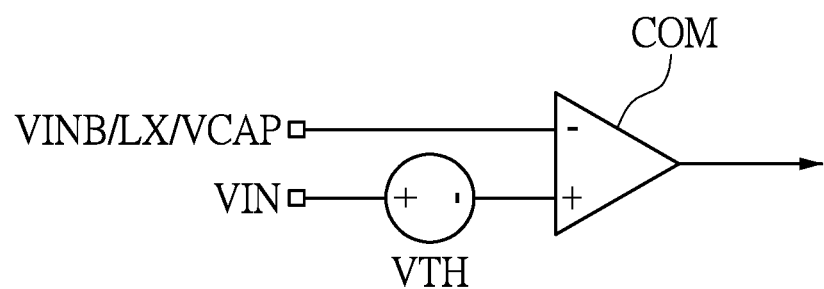
FIG. 3 is a circuit diagram of a pre-charging control circuit of a power failure prevention system with a power management mechanism according to a third embodiment of the present disclosure.

Reference is made to FIG. 3, which is a circuit diagram of a pre-charging control circuit of a power failure prevention system with a power management mechanism according to a third embodiment of the present disclosure. In the embodiment, the power failure prevention system includes the switch circuit, the energy storage circuit, the pre-charged circuit and the pre-charging control circuit.

In the embodiment, the pre-charging control circuit such as the pre-charging control circuit PCCL shown in FIG. 1 or FIG. 2 may include a comparator COM shown in FIG. 3.

A first comparison terminal of the comparator COM is connected to the pre-charged circuit PCH, and obtains the voltage VINB of the node between the pre-charged circuit PCH and the second terminal of the inductor L, the voltage LX of the switch circuit SW or the voltage VCAP of the energy storage circuit STE as the pre-charged voltage.

A second comparison terminal of the comparator COM is connected to a threshold voltage source for supplying a threshold voltage VTH. The threshold voltage VTH is subtracted from the input voltage VIN supplied by input power source to obtain a reference voltage to be inputted to the second comparison terminal of the comparator COM. The reference voltage is lower than the input voltage VIN. It should be understood that, the reference voltage in the first and second embodiments may be equal to the reference voltage in the third embodiment.

For example, the first comparison terminal of the comparator COM is an inverting terminal and the second comparison terminal of the comparator COM is a non-inverting terminal. Under this condition, when the reference voltage obtained by subtracting the threshold voltage VTH from the input voltage VIN is higher than the pre-charged voltage, the comparator COM outputs a comparison signal at a high level to the pre-charged circuit PCH shown in FIG. 2. When the reference voltage obtained by subtracting the threshold voltage VTH from the input voltage VIN is not higher than the pre-charged voltage, the comparator COM outputs the comparison signal at a low level to the pre-charged circuit PCH. As a result, the input voltage VIN stops charging the pre-charged circuit PCH and is allowed to charge the energy storage circuit STE shown in FIG. 2.

In should be understood by one having ordinary skill in the art that, in practice, the first comparison terminal may be the non-inverting terminal and the second comparison terminal may be the inverting terminal. Under this condition, the high and low levels of the comparison signal outputted by the comparator COM as described above should to be exchanged.

When the input power source is powered down and cannot normally supply the input voltage VIN to the energy storage circuit STE and the power converters CVT1 to CVTn as shown in FIG. 2, the input power source cannot pre-charge the pre-charged circuit PCH, and instead the energy storage circuit STE discharges to the input power source.

Figure 4A:
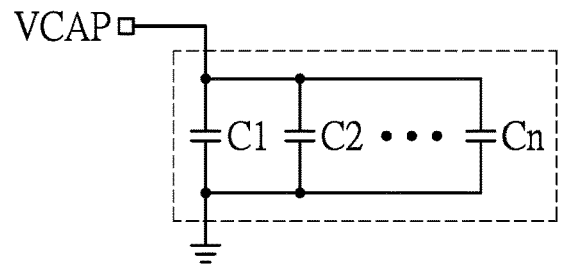
FIG. 4A is a circuit diagram of an energy storage circuit of a power failure prevention system with a power management mechanism according to a fourth embodiment of the present disclosure.

Reference is made to FIG. 4A, which is a circuit diagram of an energy storage circuit of a power failure prevention system with a power management mechanism according to a fourth embodiment of the present disclosure. In the embodiment, the power failure prevention system includes the switch circuit, the energy storage circuit, the pre-charged circuit and the pre-charging control circuit.

The energy storage circuit such as the energy storage circuit STE shown in FIG. 1 or FIG. 2 may include a plurality of capacitors C1 to Cn shown in FIG. 4A, wherein n may be any suitable integer value. The capacitors C1 to Cn are connected in parallel with each other.

Figure 4B:
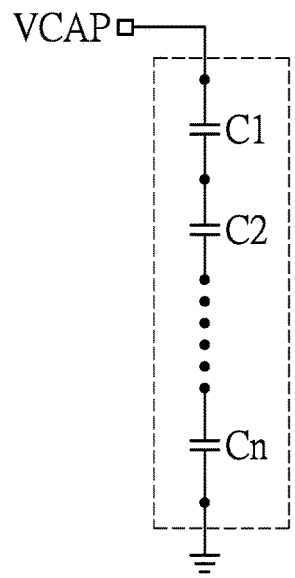
FIG. 4B is a circuit diagram of an energy storage circuit of a power failure prevention system with a power management mechanism according to a fifth embodiment of the present disclosure.

Reference is made to FIG. 4B, which is a circuit diagram of an energy storage circuit of a power failure prevention system with a power management mechanism according to a fifth embodiment of the present disclosure.

The energy storage circuit such as the energy storage circuit STE shown in FIG. 1 or FIG. 2 may include a plurality of capacitors C1 to Cn shown in FIG. 4B, wherein n may be any suitable integer value. The capacitors C1 to Cn are connected in series with each other.

Figure 4C:
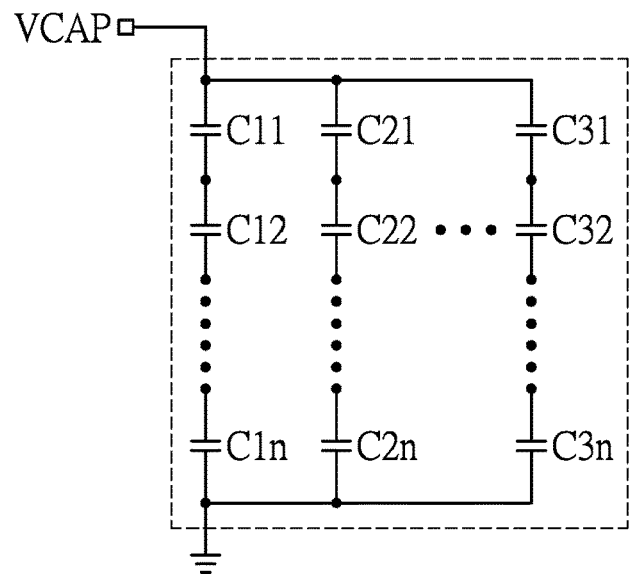
FIG. 4C is a circuit diagram of an energy storage circuit of a power failure prevention system with a power management mechanism according to a sixth embodiment of the present disclosure.

Reference is made to FIG. 4C, which is a circuit diagram of an energy storage circuit of a power failure prevention system with a power management mechanism according to a sixth embodiment of the present disclosure.

As shown in FIG. 4C, the energy storage circuit such as the energy storage circuit STE shown in FIG. 1 or FIG. 2 may include a plurality of capacitor modules. The capacitor modules are connected in parallel with each other. As shown in FIG. 4C, each of the capacitor modules may include a plurality of capacitors. For example, a first capacitor module includes a plurality of capacitors $C11$ to $C1n$, a second capacitor module includes a plurality of capacitors $C21$ to $C2n$, and a third capacitor module includes a plurality of capacitors $C31$ to $C3n$, wherein n may be any suitable integer value. The number of the capacitors included in each of the capacitor modules may be adjusted according to actual requirements.

It is should be understood that, in the energy storage circuit, the capacitors $C11$ to $C1n$, $C21$ to $C2n$ and $C31$ to $C3n$ may be replaced with other energy storage components. The present disclosure is not limited in terms of the types, the number and the configurations of the energy storage components.

Figure 5:
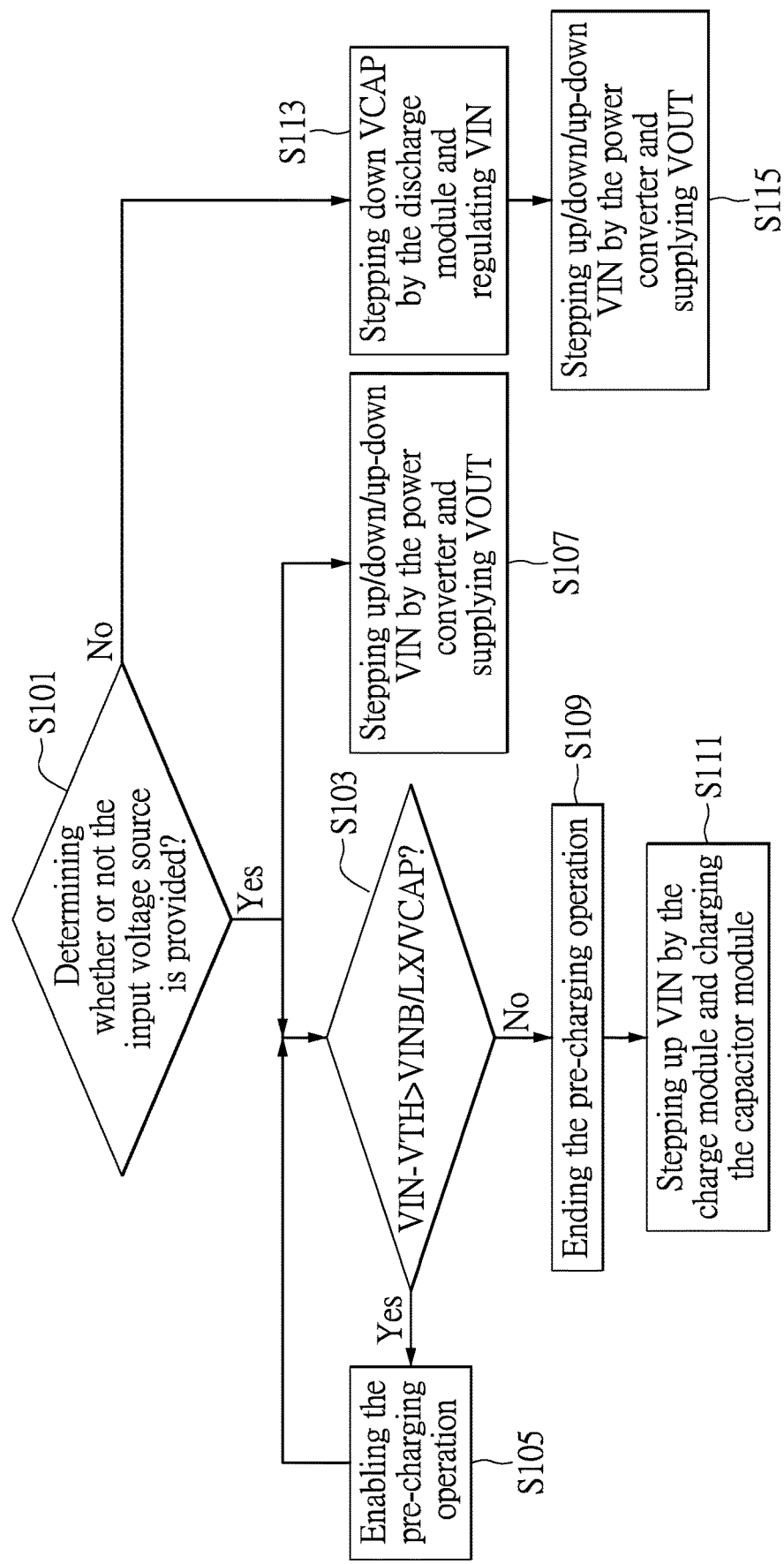
FIG. 5 is a flowchart diagram of a power failure prevention method with a power management mechanism according to a seventh embodiment of the present disclosure.

Reference is made to FIG. 5, which is a flowchart diagram of a power failure prevention method with a power management mechanism according to a seventh embodiment of the present disclosure. As shown in FIG. 5, in the embodiment, the power failure prevention method includes steps S101 to S115, which may be performed by the above-mentioned power failure prevention system and the power converters CVT1 to CVTn as shown in FIG. 2.

In step S101, it is determined whether or not the input power source provides the input voltage VIN. If the input power source provides the input voltage VIN, steps S103 and S107 are performed. If the input power source fails to provide the input voltage VIN, step S113 is performed.

In step S103, the pre-charging control circuit PCCL determines whether or not the voltage VINB of the node between the pre-charged circuit and the second terminal of the inductor, the voltage LX of the switch circuit SW or the voltage VCAP of the energy storage circuit STE is lower than the reference voltage. The reference voltage may be obtained by subtracting the threshold voltage VTH from the input voltage VIN. If the voltage VINB, the voltage LX or the voltage VCAP is lower than the reference voltage, step S105 is performed. If the voltage VINB, the voltage LX or the voltage VCAP is not lower than the reference voltage, step S109 is performed.

In step S105, the pre-charging control circuit PCCL allows the input voltage VIN provided by the input power source to pre-charge the pre-charged circuit PCH.

In step S107, the power converters CVT1 to CVTn step up, down or up to down the input voltage VIN provided by the input power source to respectively output the output voltages VOUT1 to VOUTN.

In step S109, the input voltage VIN stops pre-charging the pre-charged circuit PCH.

In step S111, a charging module steps up the input voltage VIN provided by the input power source and the input voltage VIN charges the energy storage circuit STE.

In step S113, when the input power source is powered down and cannot normally supply the input voltage VIN, the energy storage circuit STE discharges to the input power source to regulate the input voltage VIN. As a result, the input power source can normally supply the input voltage VIN to the power converters CVT1 to CVTn.

In step S115, the power converters CVT1 to CVTn step up, down or up to down the input voltage VIN and respectively output the output voltages VOUT1 to VOUTN.

In summary, the present disclosure provides the power failure prevention system with a power management mechanism and the method thereof. When the input power source can normally supply the power, the input power source charges the energy storage circuit as a backup power supply device. When the input power source is powered down, the energy storage circuit provides the voltage to the input power source such that the input power source can supply the power to the circuit components. It is worth noting that, in the present disclosure, the charging operation is divided into two stages. In the first stage, the pre-charged circuit is pre-charged. In the second stage, the energy storage circuit is charged. Therefore, when the voltage of the input power source is higher than the voltage of the energy storage circuit, the overshoot current cannot instantly flow through the energy storage circuit, thereby effectively preventing the circuit components such as the capacitor of the energy storage circuit from being damaged.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power failure prevention system with a power management mechanism, comprising:
    a switch circuit connected to a first terminal of an inductor;
    an energy storage circuit connected to the switch circuit;
    a pre-charged circuit connected to an input power source and a second terminal of the inductor, wherein the input power source pre-charges the pre-charged circuit in a pre-charging mode, and stops pre-charging the pre-charged circuit in an energy storage mode and charges the energy storage circuit through the inductor and the switch circuit;
    a control circuit connected to the switch circuit; and
    a pre-charging control circuit connected to the pre-charged circuit, configured to obtain a voltage of a node between the pre-charged circuit and the second terminal of the inductor, a voltage of the switch circuit or a voltage of the energy storage circuit as a pre-charged voltage, and configured to obtain a reference voltage lower than an input voltage provided by the input power source and compare the pre-charged voltage with the reference voltage to control the pre-charged circuit;
    wherein, when the pre-charging control circuit determines that the pre-charged voltage is lower than the reference voltage, the pre-charging control circuit controls the pre-charged circuit to operate in the pre-charging mode;
    wherein, when the pre-charging control circuit determines that the pre-charged voltage is higher than or equal to the reference voltage, the pre-charging control circuit switches the pre-charged circuit to the energy storage mode from the pre-charging mode;
    wherein the control circuit controls the switch circuit to allow a current of the inductor to flow to the energy storage circuit in the energy storage mode;
    wherein, when the input power source is powered down, the energy storage circuit discharges, and a discharge current of the energy storage circuit flows to the input power source.

2. The power failure prevention system according to claim 1, wherein a threshold voltage is subtracted from the input voltage to obtain the reference voltage.

3. The power failure prevention system according to claim 1, wherein the pre-charging control circuit includes a comparator.

4. The power failure prevention system according to claim 1, wherein the switch circuit includes an upper bridge switch and a lower bridge switch, a first terminal of the upper bridge switch is connected to the energy storage circuit, a second terminal of the upper bridge switch is connected to a first terminal of the lower bridge switch, a second terminal of the lower bridge switch is grounded, a node between the upper bridge switch and the lower bridge switch is connected to the first terminal of the inductor, a voltage of the node between the upper bridge switch and the lower bridge switch is used as the pre-charged voltage, the control circuit is connected to a control terminal of the upper bridge switch and a control terminal of the upper bridge switch, the control circuit controls the upper bridge switch and the lower bridge switch to allow the current of the inductor to flow to the energy storage circuit through the upper bridge switch in the energy storage mode.

5. The power failure prevention system according to claim 1, wherein the energy storage circuit includes a plurality of capacitors connected in parallel with each other.

6. The power failure prevention system according to claim 1, wherein the energy storage circuit includes a plurality of capacitors connected in series with each other.

7. The power failure prevention system according to claim 1, wherein the energy storage circuit includes a plurality of capacitor modules connected in parallel with each other, and each of the capacitor modules includes a plurality of capacitors connected in series with each other.

8. The power failure prevention system according to claim 1, wherein the input power source supplies the input voltage to a power converter, and the power converter steps up, down or up to down the input voltage to provide an output voltage.

9. The power failure prevention system according to claim 1, wherein when the input power source cannot supply the input voltage to a power converter, the energy storage circuit discharges to the input power source to regulate the input voltage, and the power converter steps up, down or up to down the input voltage to provide an output voltage.

10. A power failure prevention method with a power management mechanism, which is applicable to a power failure prevention system, wherein the power failure prevention system includes a switch circuit, an energy storage circuit, a control circuit, a pre-charged circuit and a pre-charging control circuit, the switch circuit is connected to a first terminal of an inductor, the pre-charged circuit is connected to an input power source and a second terminal of the inductor and the pre-charging control circuit, the control circuit is connected to the switch circuit, the power failure prevention method comprises the following steps:
 (a) pre-charging the pre-charged circuit by the input power source;
 (b) obtaining a voltage of a node between the pre-charged circuit and the second terminal of the inductor, a voltage of the switch circuit or a voltage of the energy storage circuit as a pre-charged voltage by the pre-charging control circuit;
 (c) determining, by the pre-charging control circuit, whether or not the pre-charged voltage is higher than or equal to a reference voltage, wherein the reference voltage is lower than an input voltage provided by the input power source, in response to determining that the pre-charged voltage is not higher than or equal to the reference voltage, returning to step (a), in response to determining that the pre-charged voltage is higher than or equal to the reference voltage, performing next step (d);
 (d) stopping pre-charging the pre-charged circuit and controlling the switch circuit to allow a current of the inductor to flow to the energy storage circuit by the control circuit in an energy storage mode;
 wherein, when the input power source is powered down, the energy storage circuit discharges, and a discharge current of the energy storage circuit flows to the input power source.

11. The power failure prevention method according to claim 10, further comprising the following step:
 subtracting a threshold voltage from the input voltage to obtain the reference voltage by the pre-charging control circuit.

12. The power failure prevention method according to claim 10, further comprising the following step:
 obtaining a voltage of the node between an upper bridge switch and a lower bridge switch as the pre-charged voltage by the pre-charging control circuit, wherein the node between the upper bridge switch and the lower bridge switch is connected to the first terminal of the inductor.

13. The power failure prevention method according to claim 10, further comprising the following step:
 determining whether or not the input power source supplies the input voltage to a power converter, in response to determining that the input power source supplies the input voltage to the power converter, stepping up, down or up to down the input voltage to provide an output voltage by the power converter, in response to determining that the input power source does not supply the input voltage to the power converter, discharging the input power source to the input power source to regulate the input voltage by the energy storage circuit, and stepping up, down or up to down the input voltage to provide an output voltage by the power converter.

14. The power failure prevention method according to claim 10, wherein controlling the switch circuit to allow the current of the inductor to flow to the energy storage circuit comprises: controlling an upper bridge switch of the switch circuit and a lower bridge switch of the switch circuit to allow the current of the inductor to flow to the energy storage circuit through the upper bridge switch in the energy storage mode.

* * * * *